United States Patent
Tsubota et al.

(10) Patent No.: US 8,203,446 B2
(45) Date of Patent: Jun. 19, 2012

(54) RADIO COMMUNICATION TERMINAL

(75) Inventors: Keiji Tsubota, Kanagawa (JP); Yutaka Yoshida, Kanagawa (JP); Yasunori Ohta, Kanagawa (JP); Naoyuki Nishino, Kanagawa (JP); Takeshi Kamiya, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 491 days.

(21) Appl. No.: 12/553,112

(22) Filed: Sep. 3, 2009

(65) Prior Publication Data

US 2010/0079273 A1 Apr. 1, 2010

(30) Foreign Application Priority Data

Sep. 30, 2008 (JP) ................................. 2008-254623

(51) Int. Cl.
G08B 1/08 (2006.01)

(52) U.S. Cl. ................................. 340/539.1; 340/572.1

(58) Field of Classification Search ............... 340/539.1, 340/572.1, 10.1
See application file for complete search history.

(56) References Cited

U.S. PATENT DOCUMENTS

2004/0085441 A1* 5/2004 Onishi et al. .................... 348/65

FOREIGN PATENT DOCUMENTS

| JP | 2001-016367 A | 1/2001 |
| JP | 2002-315050 A | 10/2002 |
| JP | 2003-189359 A | 7/2003 |
| JP | 2004-97638 A | 4/2004 |
| JP | 2005-176973 A | 7/2005 |
| JP | 2006-81729 A | 3/2006 |
| JP | 2008-534617 A | 8/2008 |

OTHER PUBLICATIONS

Corresponding Japanese Office Action issued on Nov. 22, 2011 (Japanese Application No. 2008-254623).
"Studies on the Processing and Wireless Transmission of Bio-signals" (Mar. 2003) by Masaki Kyoso.

* cited by examiner

*Primary Examiner* — Shirley Lu
(74) *Attorney, Agent, or Firm* — SOLARIS Intellectual Property Group, PLLC

(57) ABSTRACT

A radio communication terminal includes a radio communication unit that performs radio communication with another device, a detector that detects radio waves in a predetermined frequency range emitted from a medical device that is used integrally with a human body, and a prohibition unit that prohibits radio communication by the radio communication unit when radio waves in the predetermined frequency range have been detected.

7 Claims, 6 Drawing Sheets

RADIO COMMUNICATION TERMINAL

CROSS-REFERENCE TO RELATED APPLICATION

This application claims priority under 35 USC 119 from Japanese Patent Application No. 2008-254623 filed on Sep. 30, 2008, the disclosure of which is incorporated by reference herein.

BACKGROUND OF THE INVENTION

1. Field of the Invention

The present invention pertains to a radio communication terminal and particularly relates to a radio communication terminal that is used in medical institutions.

2. Description of the Related Art

In recent years, flat panel detectors (FPD) that comprise a radiation sensitive layer disposed on a thin-film transistor (TFT) active matrix substrate and can directly convert radiation into digital data have been put to practical use. Portable radiographic image capturing devices (called "electronic cassettes" below) that use a FPD or the like to generate image information (data) representing a radiographic image expressed by radiation with which the flat panel detector has been irradiated and store the generated image data have been put to practical use.

Electronic cassettes are portable, so they can also capture images of patients lying on a stretcher or a bed as they are, and electronic cassettes can flexibly accommodate patients who cannot move, because the place where an image is to be captured can be adjusted by changing the position of the electronic cassette.

Incidentally, radiographic image capturing systems where communication between the electronic cassette and a control device for control (a so-called console) is performed by radio communication are known. In a system where radio communication is performed between devices in this manner, there may be interference with respect to medical devices such as a cardiac pacemaker resulting from radio electromagnetic waves.

Japanese Patent Application Laid-Open Publication (JP-A) No. 2005-176973 discloses a technology that sets the transmission output and/or the transmission rate of radio communication low when a metal has been detected as a result of analyzing a radiographic image that has been obtained by image capturing.

Further, JP-A No. 2006-81729 discloses a technology that stores beforehand pacemaker information relating to whether or not a cardiac pacemaker is implanted in the heart of a subject of which a radiographic image is to be captured and, on the basis of the pacemaker information, stops radio communication from a radio communication device when a pacemaker is implanted in the heart of the subject.

Moreover, JP-A No. 2004-97638 discloses a technology where an operator that operates an X-ray image capturing system to perform image capturing carries a transmitter that transmits radio waves, a receiver that is capable of detecting the radio waves that the transmitter transmits is installed in an image capturing room that is affected by X-rays, and an X-ray generator is prohibited to emit X-rays while the receiver is receiving the radio waves that the transmitter transmits.

However, in the technology of JP-A No. 2005-176973, whether or not there is a medical device is not known until after a radiographic image has been captured and analyzed, and interference with respect to medical devices resulting from radio electromagnetic waves cannot be sufficiently controlled. In the technology of JP-A No. 2006-81729, although interference with respect to medical devices resulting from radio electromagnetic waves can be controlled when capturing an image of a patient in whose heart a cardiac pacemaker has been implanted, radio communication between the electronic cassette and the console cannot be performed even when the patient is not nearby. Moreover, the technology of JP-A No. 2004-97638 is a technology that simply prohibits irradiation with X-rays, and interference with respect to medical devices such as cardiac pacemakers resulting from radio electromagnetic waves remains a potential.

SUMMARY

The present invention has been made in view of the above circumstances and provides a radio communication terminal that can perform radio communication while controlling interference with respect to medical devices resulting from radio electromagnetic waves.

One aspect of the present invention is a radio communication terminal including: a radio communication unit that performs radio communication with another device; a detector that detects radio waves in a predetermined frequency range emitted from a medical device that is used integrally with a human body; and a prohibition unit that prohibits radio communication by the radio communication unit when radio waves in the predetermined frequency range have been detected.

Another aspect of the present invention is a radio communication terminal including: a radio communication unit that performs radio communication with another device; and a prohibition unit that prohibits radio communication by the radio communication unit when information calling for prohibition of radio communication as a result of having detected radio waves in a predetermined frequency range emitted from a medical device that is implanted and used in a human body has been received by the radio communication unit.

BRIEF DESCRIPTION OF THE DRAWINGS

An exemplary embodiment of the present invention will be described in detail based on the following figures, wherein.

DETAILED DESCRIPTION

Below, an exemplary embodiment will be described in detail with reference to the drawings.

First, the configuration of a radiology information system (RIS) 10 pertaining to the exemplary embodiment will be described.

Figure 1:
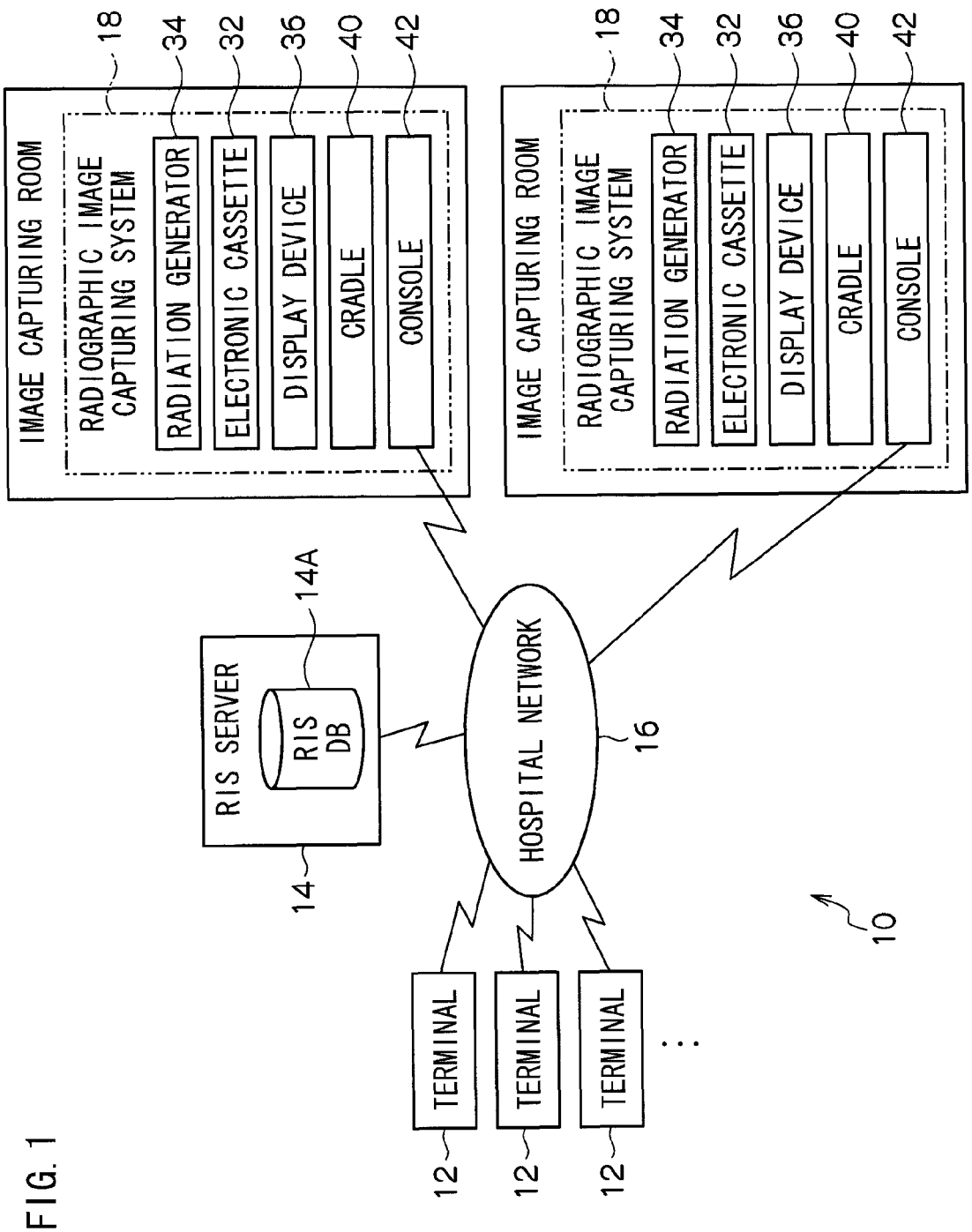
FIG. 1 is a block diagram showing the configuration of a radiology information system pertaining to the exemplary embodiment.

In FIG. 1, there is shown a block diagram showing each component of the radiology information system 10 (which will be called "the RIS 10" below).

The RIS 10 is a system for managing information such as medical service appointments and diagnostic records in a radiology department and configures part of a hospital information system (HIS).

The RIS 10 is configured with plural image capture request terminals 12 (which will be called "the terminals 12" below), a radiology information system (RIS) server 14 and radiographic image capturing systems 18 installed in individual radiographic image capturing rooms (or operating rooms) in a hospital being connected to a hospital network 16 that is structured by a wired or wireless local area network (LAN). The RIS 10 serves as part of the hospital information system (HIS) that is disposed in the same hospital, and an HIS server (not shown) that manages the entire HIS is also connected to the hospital network 16.

The terminals 12 are devices for doctors 26 (see FIG. 2) or a radiologic technologist to input/browse diagnostic information and facility reservations, and requests to capture radiographic images (image capture reservations) are also performed from the terminals 12. Each of the terminals 12 is configured by a personal computer equipped with a display device, and the terminals are connected by the hospital network 16 to the RIS server 14 so as to be capable of communicating with each other.

The RIS server 14 is a server that receives the image capture requests from the terminals 12 and manages radiographic image capture schedules in the image capturing systems 18, and the RIS server 14 includes a database 14A.

The database 14A includes information relating to a patient 30 (see FIG. 2), such as attribute information (name, sex, date of birth, age, blood type, patient ID, and the like) of the patient 30, medical history, consultation history, radiographic images captured in the past, information relating to electronic cassettes 32 of the capturing systems 18, such as ID numbers, types, sizes, sensitivities, image capture areas where the electronic cassettes 32 are useable (contents of image capture requests that the electronic cassettes 32 are capable of accommodating), starting dates of use, numbers of times used, and environment information representing the environment in which the electronic cassettes 32 are to be used to capture radiographic images, that is, the environment in which the electronic cassettes 32 are to be used (for example, an operating room or an image capturing room established exclusively to capture radiographic images).

The image capturing systems 18 capture radiographic images by operation of the doctors 26 or a radiologic technologist in response to an instruction from the RIS server 14. Each of the capturing systems 18 is equipped with a radiation generator 34 that irradiates a subject with radiation X of a radiation amount corresponding to image capture conditions, an electronic cassette 32 that includes a built-in radiation detector 60 (see FIG. 3) that detects the radiation X that has been transmitted through the patient 30 and converts that radiation X into radiographic image information (data), a display device 36 that displays a radiographic image based on the radiation X that has been detected by the radiation detector 60, a cradle 40 that charges a battery built into the electronic cassette 32, and a console 42 that controls the electronic cassette 32, the radiation generator 34, the display device 36 and the cradle 40.

Figure 2:
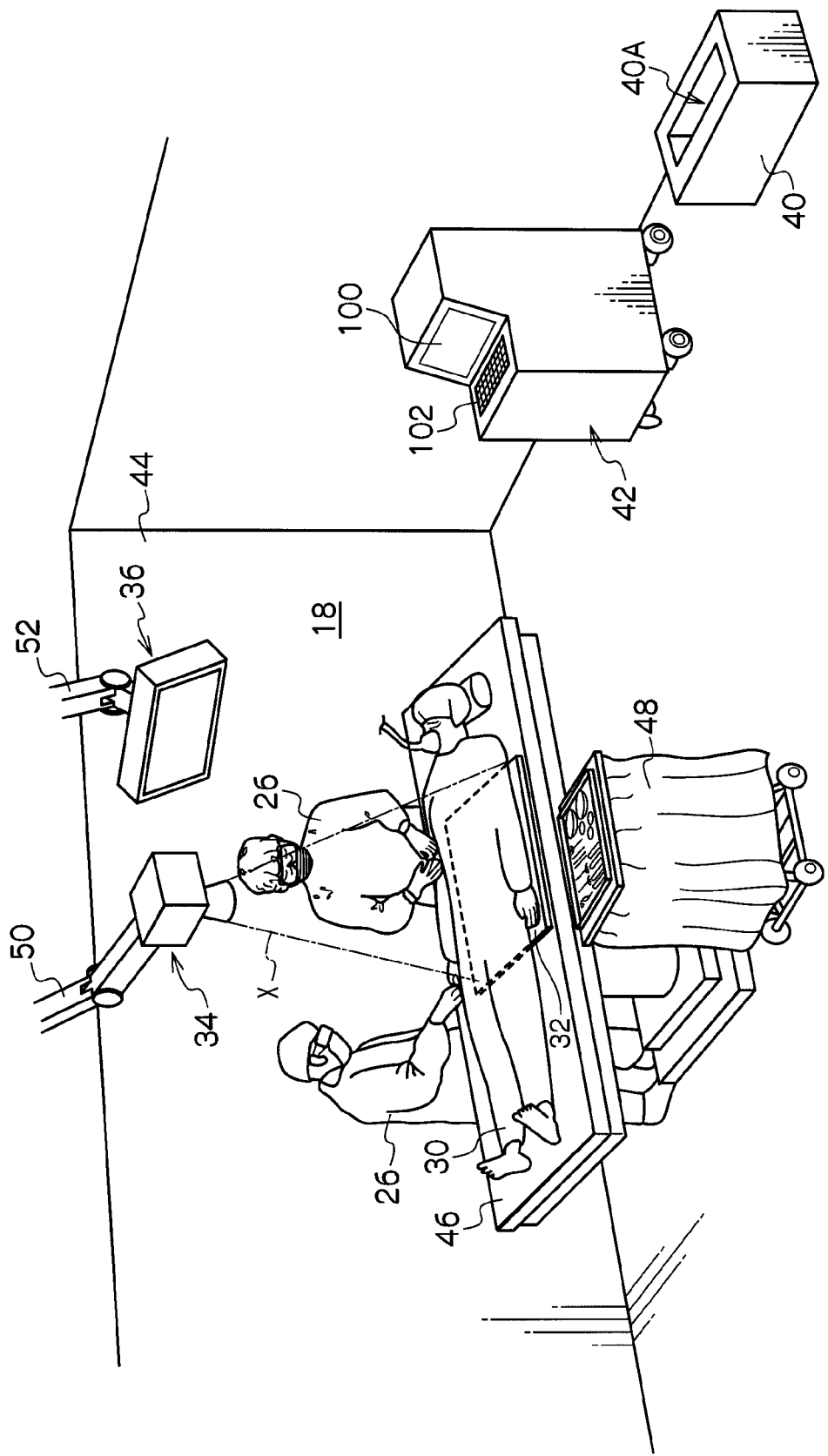
FIG. 2 is a diagram showing an operating room in which the radiographic image capturing system pertaining to the exemplary embodiment is installed.

FIG. 2 shows the inside of an operating room 44 that serves as an image capturing room in which one of the image capturing systems 18 is installed as an example where the image capturing system 18 is disposed. In the image capturing system 18, the console 42 is respectively connected to the radiation generator 34 and the display device 36 by cables such that these devices transmit and receive various types of information by wired communication, but in FIG. 2, the cables that interconnect these devices are omitted. Further, the electronic cassette 32 and the console 42 transmit and receive various types of information by radio communication or wired communication.

In the operating room 44 of FIG. 2, in addition to the image capturing system 18, an operating table 46 on which the patient 30 lies is disposed, and an instrument table 48 on which are placed various types of instruments that the doctors 26 use in surgery is disposed on the side of the operating table 46. Various devices needed for surgery, such as an anesthesia machine, an evacuator, an electrocardiograph and a blood pressure monitor, are disposed around the operating table 46 (these devices are omitted in FIG. 2).

The radiation generator 34 is coupled to an adjustable arm 50 such that the radiation generator 34 can be moved to a desired position corresponding to the area of the patient 30 of which an image is to be captured and such that the radiation generator 34 can be withdrawn to a position where it does not hinder surgery by the doctors 26. Similarly, the display device 36 is coupled to an adjustable arm 52 such that the display device 36 can be moved to a position where the doctors 26 can easily check the radiographic image that has been captured.

In the cradle 40, there is formed a housing portion 40A that is capable of housing the electronic cassette 32.

When the electronic cassette 32 stands by, the electronic cassette 32 is housed in the housing portion 40A of the cradle 40 and the built-in battery is charged, and when a radiographic image is to be captured, the electronic cassette 32 is removed from the cradle 40 and disposed in the area of the patient 30 of which an image is to be captured.

The electronic cassette 32 is not limited to being used in the operating room 44 and can also be applied to medical screenings and rounds inside a hospital, for example.

Figure 3:
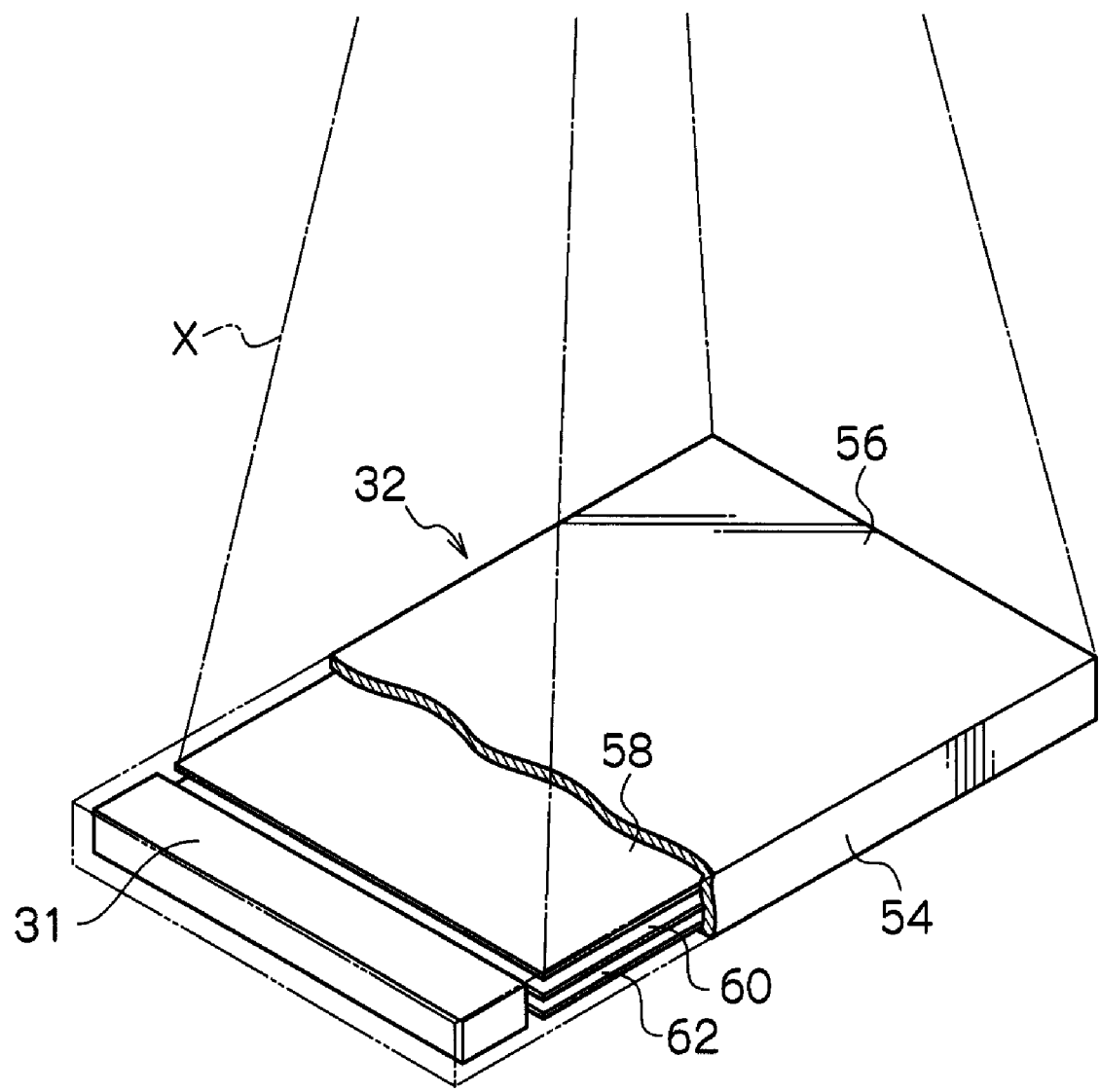
FIG. 3 is a transparent perspective diagram showing the internal configuration of an electronic cassette pertaining to the exemplary embodiment.

FIG. 3 shows the internal configuration of the electronic cassette 32 pertaining to the exemplary embodiment.

As shown in FIG. 3, the electronic cassette 32 is equipped with a casing 54 formed by a material that allows the radiation X to be transmitted therethrough, and the electronic cassette 32 is configured to have a waterproof and hermetic structure. There is the fear that blood or another contaminant may adhere to the electronic cassette 32 when the electronic cassette 32 is used in the operating room 44 or the like. Thus, the electronic cassette 32 is configured to have a waterproof and hermetic structure and is washed with an antiseptic as needed, so that the one electronic cassette 32 can be used repeatedly.

Inside the casing 54 (see FIG. 3), there are disposed, in order from an irradiated surface 56 side of the casing 54 that is irradiated with the radiation X, a grid 58 that removes scattered radiation of the radiation X resulting from the patient 30, the radiation detector 60 that detects the radiation X that has been transmitted through the patient 30, and a lead plate 62 that absorbs back scattered radiation of the radiation X. The irradiated surface 56 of the casing 54 may also be configured by the grid 58.

A case 31 that houses electronic circuits including a microcomputer and a rechargeable secondary battery is disposed on one end side of the inside of the casing 54. The radiation detector 60 and the electronic circuits are actuated by power supplied from the secondary battery disposed in the case 31. A lead plate or the like may also be disposed on the irradiated surface 56 side of the case 31 in order to avoid a situation where the various circuits housed inside the case 31 sustain damage in accompaniment with being irradiated with the radiation X.

Figure 4:
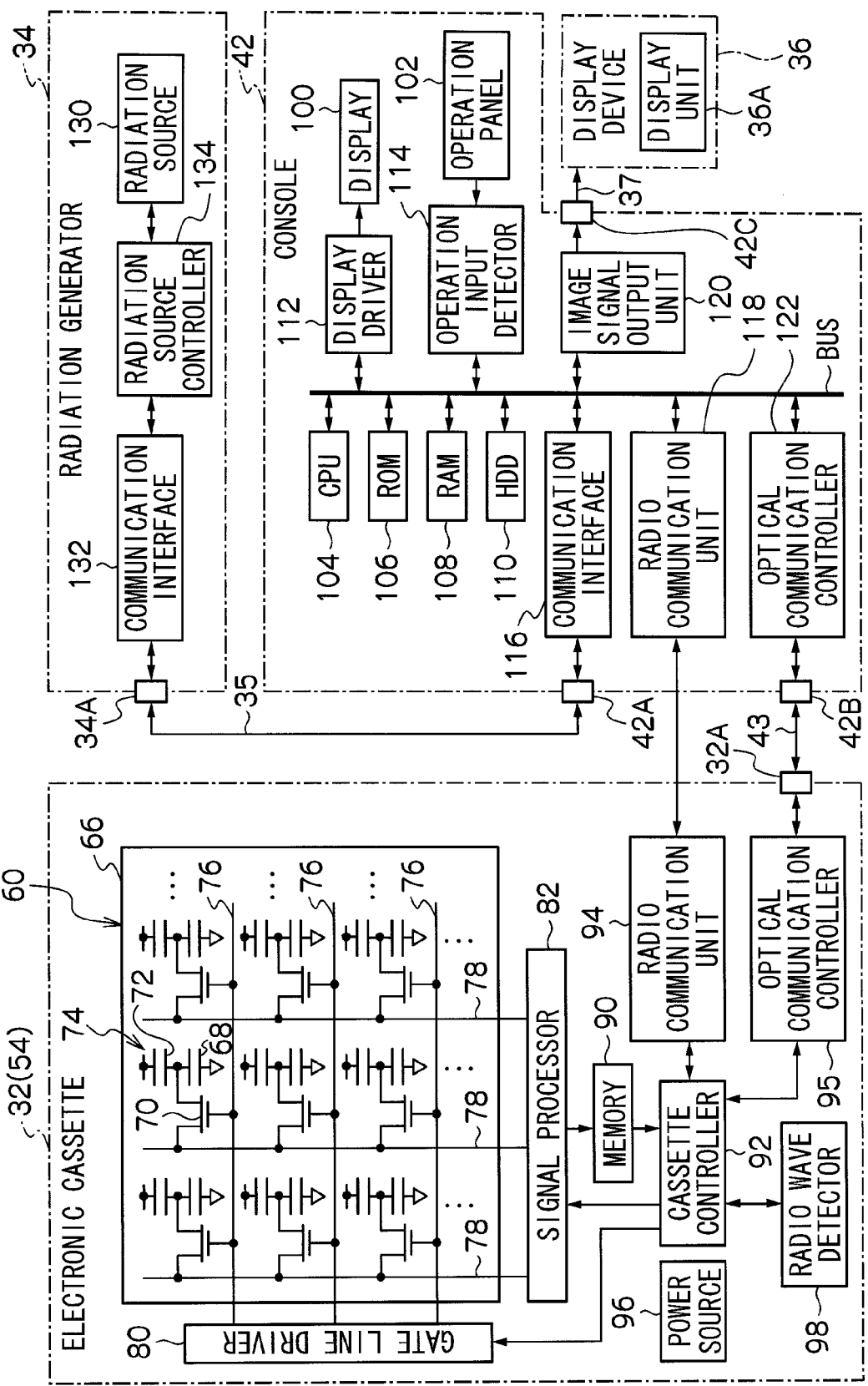
FIG. 4 is a block diagram showing the detailed configuration of the radiographic image capturing system pertaining to the exemplary embodiment.

FIG. 4 shows a block diagram showing the detailed configuration of the radiographic image capturing system 18.

A connection terminal 32A for performing wired communication with the console 42 is disposed in the electronic cassette 32. A connection terminal 34A for performing wired communication with the console 42 is disposed in the radiation generator 34. A connection terminal 42A for performing communication with the radiation generator 34, a connection terminal 42B for performing wired communication with the electronic cassette 32 and a connection terminal 42C for outputting image signals to the display device 36 are disposed in the console 42.

The radiation generator 34 is connected to the console 42 via a communication cable 35, and the display device 36 is connected to the console 42 via a display cable 37.

The electronic cassette 32 and the console 42 are capable of communicating with each other by wired communication or radio communication and are interconnected by a communication cable 43 when performing wired communication. In the exemplary embodiment, an optical communication cable using optical fiber is used for the communication cable 43 in order to perform data transfer between the electronic cassette 32 and the console 42 at a high speed, and the transfer of data is performed between the electronic cassette 32 and the console 42 by optical communication.

The radiation detector 60 built into the electronic cassette 32 is configured by a photoelectric conversion layer that absorbs and converts the radiation X into electric charges being layered on a TFT active matrix substrate 66. The photoelectric conversion layer comprises, for example, amorphous selenium (a-Se) whose main component (e.g., having a content percentage equal to or greater than 50%) is selenium, and when the photoelectric conversion layer is irradiated with the radiation X, the photoelectric conversion layer converts the radiation X which has been irradiated into electric charges by generating, inside itself, electric charges (electron-hole pairs) of an electric charge amount corresponding to the amount of the radiation X which has been irradiated. The radiation detector 60 may also, instead of a material that directly converts the radiation X into electric charges such as amorphous selenium, use a fluorescent material and a photoelectric conversion element (photodiode) to indirectly convert the radiation X into electric charges. As the phosphor material, gadolinium oxysulfide (GOS) and cesium iodide (CsI) are well known. In this case, conversion of the radiation X into light is performed by the fluorescent material, and conversion of the light into electric charges is performed by the photodiode of the photoelectric conversion element.

Further, on the TFT active matrix substrate 66, numerous pixels 74 (in FIG. 4, the photoelectric conversion layer corresponding to the individual pixels 74 is schematically shown as photoelectric converters 72) equipped with storage capacitors 68 that store the electric charges that have been generated by the photoelectric conversion layer and TFTs 70 for reading the electric charges that have been stored in the storage capacitors 68 are arranged in a matrix. The electric charges that have been generated in the photoelectric conversion layer by the irradiation of the electronic cassette 32 with the radiation X are stored in the storage capacitors 68 of the individual pixels 74. Thus, the image information that had been carried in the radiation X with which the electronic cassette 32 was irradiated is converted into electric charge information (an amount of electric charge) and is held in the radiation detector 60.

Further, on the TFT active matrix substrate 66, there are disposed plural gate lines 76, which extend in a constant direction (row direction) and are for switching ON and OFF the TFTs 70 of the individual pixels 74, and plural data lines 78, which extend in a direction (column direction) orthogonal to the gate lines 76 and are for reading the stored electric charges from the storage capacitors 68 via the TFTs 70 that have been switched ON. The individual gate lines 76 are connected to a gate line driver 80, and the individual data lines 78 are connected to a signal processor 82. When the electric charges are stored in the storage capacitors 68 of the individual pixels 74, the TFTs 70 of the individual pixels 74 are switched ON in order in row units by signals that are supplied via the gate lines 76 from the gate line driver 80. The electric charges that are stored in the storage capacitors 68 of the pixels 74 whose TFTs 70 have been switched ON are transmitted through the data lines 78 as electric charge signals and are inputted to the signal processor 82. Consequently, the electric charges that are stored in the storage capacitors 68 of the individual pixels 74 are read in order in row units.

Figure 5:
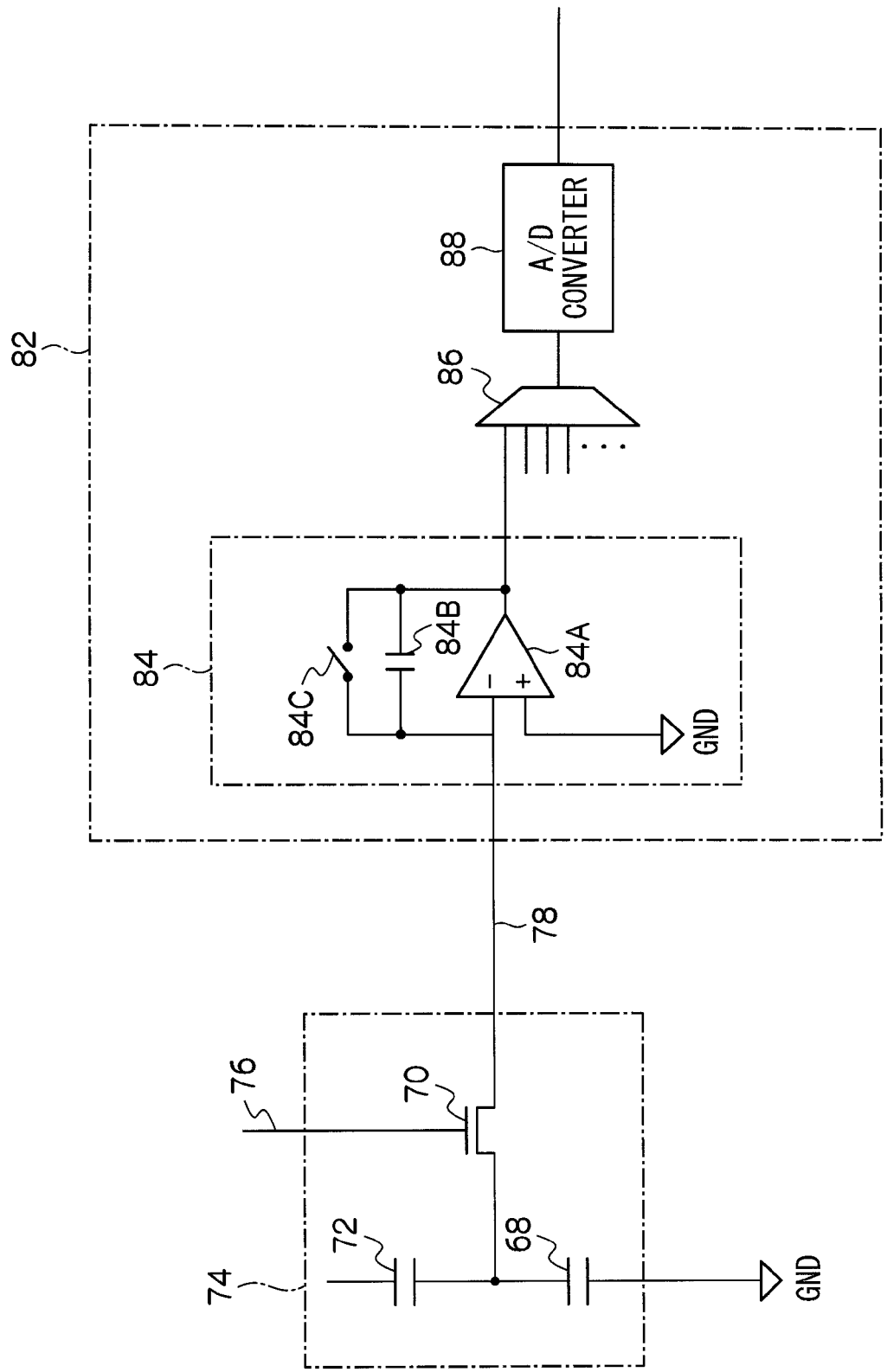
FIG. 5 is an equivalent circuit diagram focusing on one pixel of a radiation detector pertaining to the exemplary embodiment.

In FIG. 5, there is shown an equivalent circuit diagram focusing on one pixel portion of the radiation detector 60 pertaining to the exemplary embodiment.

As shown in FIG. 5, a source of the TFT 70 is connected to the data line 78, and the data line 78 is connected to the signal processor 82. Further, a drain of the TFT 70 is connected to the storage capacitor 68 and to the photoelectric converter 72, and a gate of the TFT 70 is connected to the gate line 76.

The signal processor 82 is equipped with a sample/hold circuit 84 for each of the individual data lines 78. The electric charge signals that have been transmitted through the individual data lines 78 are held in the sample/hold circuits 84. The sample/hold circuit 84 includes an operational amplifier (op-amp) 84A and a capacitor 84B and converts the electric charge signal into an analog voltage. Further, a switch 84C, which serves as a reset circuit that causes both electrodes of the capacitor 84B to short to cause the electric charge stored in the capacitor 84B to be discharged as a result of the switch 84C being switched ON, is disposed in the sample/hold circuit 84.

A multiplexer 86 and an analog/digital (A/D) converter 88 are connected in this order at an output side of the sample/hold circuits 84. The electric charge signals held in the individual sample/hold circuits 84 are converted into analog voltages, and the analog voltages are inputted in order (serially) to the multiplexer 86 and converted into digital image data by the A/D converter 88.

A memory 90 is connected to the signal processor 82 (see FIG. 4). The image data that have been outputted from the A/D converter 88 of the signal processor 82 are stored in order in the memory 90. The memory 90 has a storage capacity that is capable of storing a predetermined number of frames' worth of image data representing a radiographic image, and each time reading of electric charges is performed one line at a time, the one line's worth of image data that have been read are sequentially stored in the memory 90.

The memory 90 is connected to a cassette controller 92 that controls operation of the entire electronic cassette 32. The cassette controller 92 is realized by a microcomputer. A radio communication unit 94 and an optical communication controller 95 are connected to the cassette controller 92. The radio communication unit 94 corresponds to a wireless local area network (LAN) specification represented by for example IEEE (Institute of Electrical and Electronics Engineers) 802.11a/b/g and controls the transmission of various types of information between the electronic cassette 32 and an external device by radio communication. The optical communication controller 95 is connected to the connection terminal 32A and controls the transmission of various types of information between the electronic cassette 32 and the console 42 via the connection terminal 32A and the communication cable 43. The cassette controller 92 transmits various types of information to and receives various types of information from the console 42 via the radio communication unit 94 or the optical communication controller 95.

Further, a radio wave detector 98 is connected to the cassette controller 92. In the exemplary embodiment, the radio wave detector 98 obtains the frequency of radio waves emitted from a medical device such as a cardiac pacemaker to set a frequency range serving as a detection target including the obtained frequency. The radio wave detector 98 detects whether or not radio waves in a predetermined frequency range serving as a detection target are included in the frequency of radio waves that are detected.

Further, a power source 96 is disposed in the electronic cassette 32, and the various circuits and elements mentioned above (such as the gate line driver 80, the signal processor 82, the memory 90, the radio communication unit 94, the optical communication controller 95, the microcomputer that functions as the cassette controller 92, and the radio wave detector 98) are actuated by power supplied from the power source 96. The power source 96 has a built-in battery (a rechargeable secondary battery) so as to not impair the portability of the electronic cassette 32, and the power source 96 supplies power to the various circuits and elements from the charged battery.

The console 42 is configured as a server computer and is equipped with a display 100, which displays operation menus and radiographic images that have been captured, and an operation panel 102, which includes plural keys and by which various types of information and operation instructions are inputted.

Further, the console 42 pertaining to the exemplary embodiment is equipped with a central processing unit (CPU) 104 that controls operation of the entire device, a read-only memory (ROM) 106 in which various programs including a control program are stored beforehand, a random-access memory (RAM) 108 that temporarily stores various types of data, a hard disk drive (HDD) 110 that stores and maintains various types of data, a display driver 112 that controls the display of various types of information on the display 100, an operation input detector 114 that detects states of operation with respect to the operation panel 102, a communication interface 116 that is connected to the connection terminal 42A and transmits various types of information to and receives various types of information from the radiation generator 34 via the connection terminal 42A and the communication cable 35 such as later-described exposure conditions and state information of the radiation generator 34, a radio communication unit 118 that transmits various types of information to and receives various types of information from the electronic cassette 32 by radio communication such as image capture control data and image data, an image signal output unit 120 that is connected to the connection terminal 42C and outputs image signals to the display device 36 via the connection terminal 42C and the display cable 37, and an optical communication controller 122 that is connected to the connection terminal 42B and transmits various types of information to and receives various types of information from the electronic cassette 32 via the connection terminal 42B and the communication cable 43.

The CPU 104, the ROM 106, the RAM 108, the HDD 110, the display driver 112, the operation input detector 114, the communication interface 116, the radio communication unit 118, the image signal output unit 120 and the optical communication controller 122 are interconnected via a system bus BUS. Consequently, the CPU 104 can access the ROM 106, the RAM 108 and the HDD 110, can control the display of various types of information on the display 100 via the display driver 112, can control the transmission of various types of information to and the reception of various types of information from the radiation generator 34 via the communication interface 116, can control the transmission of various types of information to and the reception of various types of information from the electronic cassette 32 via the radio communication unit 118, can control the transmission of various types of information to and the reception of various types of information from the electronic cassette 32 via the optical communication controller 122, and can control images displayed on the display device 36 via the image signal output unit 120. Further, the CPU 104 can grasp states of operation by a user with respect to the operation panel 102 via the operation input detector 114.

The radiation generator 34 is equipped with a radiation source 130 that outputs the radiation X, a communication interface 132 that transmits various types of information to and receives various types of information from the console 42 such as exposure conditions and state information of the radiation generator 34, and a radiation source controller 134 that controls the radiation source 130 on the basis of received exposure conditions. The radiation source controller 134 is also realized by a microcomputer, stores the received exposure conditions, and causes the radiation source 130 to irradiate the patient 30 with the radiation X on the basis of the stored exposure conditions.

Further, the display device 36 is equipped with a display unit 36A that displays images represented by received image signals.

In the exemplary embodiment, the display unit 36A and the display 100 perform visible display using a liquid crystal display (LCD). However, the display unit 36A and the display 100 are not limited to this and may also perform visible display using another display such as an organic EL display or a CRT display.

Next, overall operation of the RIS 10 pertaining to the exemplary embodiment will be described.

The electronic cassette 32 and the console 42 pertaining to the exemplary embodiment perform wired communication when they are interconnected by the communication cable 43 and perform radio communication when they are not interconnected by the communication cable 43.

One of the terminals 12 (see FIG. 1) receives an image capture request including environment information from one of the doctors 26 or radiologic technologists. In the image capture request, there are designated the environment in which the electronic cassette 32 is to be used, the date and time of image capture and image capture conditions (the area of the patient 30 of which an image is to be captured, the angle and the number of images, the tube voltage, the tube current and the irradiation time for irradiating the patient 30 with the radiation X, and the size and the sensitivity of the electronic cassette 32).

The terminals 12 notifies the RIS server 14 of the content of the received image capture request. The RIS server 14 stores, in the database 14A, the content of the image capture request which has been notified by the terminals 12.

The console 42 accesses the RIS 14 to acquire the content of the image capture request and the environment information associated therewith from the RIS server 14 and display the content of the image capture request on the display 100 (see FIG. 2 and FIG. 4).

The doctor 26 or radiologic technologist initiates capture of a radiographic image on the basis of the content of the image capture request displayed on the display 100.

For example, as shown in FIG. 2, when capture of a radiographic image of an affected area of the patient 30 lying on the operating table 46 is to be performed using radio communication between the electronic cassette 32 and the console 42, the doctor 26 or radiologic technologist disposes the electronic cassette 32 between the operating table 46 and the affected area of the patient 30 in accordance with the area and angle of image capture without connecting the communication cable 43 to the electronic cassette 32 and the console 42 and disposes the radiation generator 34 over the affected area. Further, the doctor 26 or radiologic technologist performs, with respect to the operation panel 102 of the console 42 in accordance with the area of the patient 30 of which an image is to be captured and image capture conditions, an operation to designate exposure conditions such as the tube voltage, the tube current and the irradiation time when irradiating the patient 30 with the radiation X. When exposure preparation of the radiation generator 34 is completed, the doctor 26 or radiologic technologist performs, with respect to the operation panel 102 of the console 42, image capture instruction operation to instruct image capture.

Sometimes the patient 30 has a medical device such as a cardiac pacemaker. In the electronic cassette 32, the radio wave detector 98 detects radio waves in a predetermined frequency range emitted from a medical device such as a cardiac pacemaker. The cassette controller 92 executes the following radio communication prohibition processing program to prohibit radio communication with the console 42 when radio waves in the predetermined frequency range have been detected by the radio wave detector 98.

Figure 6:
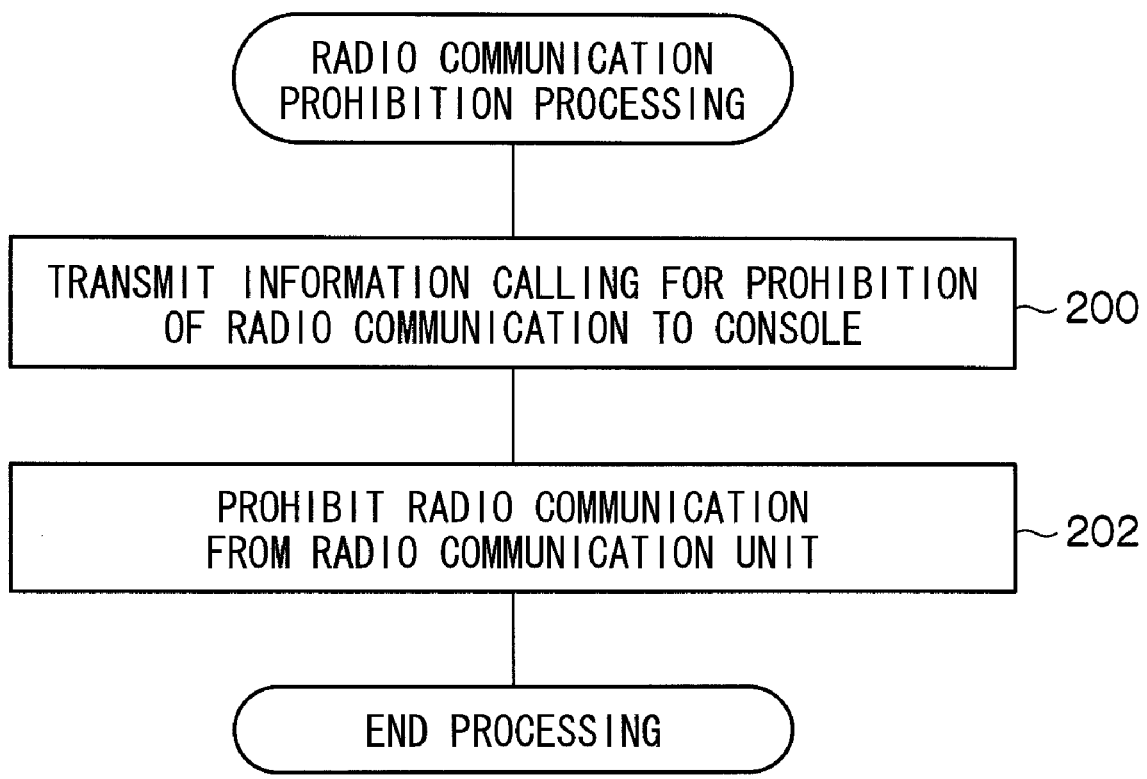
FIG. 6 is a flowchart showing a flow of a radio communication prohibition processing program pertaining to the exemplary embodiment.

FIG. 6 shows a flowchart showing a flow of the radio communication prohibition processing program. This program is stored beforehand in a predetermined region in a storage unit (not shown) such as a ROM that is disposed in the cassette controller 92.

In step 200 of FIG. 6, the cassette controller 92 transmits information calling for prohibition of radio communication from the radio communication unit 94 to the console 42 by radio communication.

In the next step 202, the cassette controller 92 prohibits radio communication from the radio communication unit 94 and ends processing.

When the console 42 receives the information calling for prohibition of radio communication, the console 42 prohibits radio communication by the radio communication unit 118 and, displays on the display 100 a warning message urging switching to wired communication because a medical device such as a cardiac pacemaker that is affected by radio communication has been detected from the patient.

When the warning message is displayed on the display 100, the doctor 26 or radiologic technician may interconnect the electronic cassette 32 and the console 42 with the communication cable 43 and may perform image capture by wired communication.

As described above, according to the exemplary embodiment, when radio waves in a predetermined frequency range emitted from a medical device such as a cardiac pacemaker have been detected by the radio wave detector 98, the cassette controller 92 prohibits radio communication by the radio communication unit 94. For that reason, the electronic cassette 32 can perform radio communication while controlling interference with respect to medical devices such as a cardiac pacemaker resulting from radio electromagnetic waves.

In the exemplary embodiment, a case has been described where the invention is applied to the electronic cassette 32 that is a portable radiographic image capturing device. However, embodiments are not limited to this and may also be applied to various types of radio communication terminals that perform radio communication.

In the exemplary embodiment, a case has been described where the electronic cassette 32 prohibits radio communication after transmitting information calling for prohibition of radio communication to the console 42. However, embodiments are not limited to this and may also be configured such that the electronic cassette 32 transmits information calling for prohibition of radio communication to another peripheral radio communication terminal by broadcast, for example. Further, for example, when each of the radio communication terminals is used near the patient, each of the radio communication terminals may just prohibit its own radio communication.

In the exemplary embodiment, a case has been described where the radio wave detector 98 is disposed separately from the radio communication unit 94 and where the radio wave detector 98 detects radio waves in the predetermined frequency range. However, embodiments are not limited to this and may also be configured such that, for example, the radio communication unit 94 detects radio waves in the predetermined frequency range.

In the exemplary embodiment, a case has been described where the cassette controller 92 prohibits radio communication by the radio communication unit 94 when radio waves in the predetermined frequency range have been detected. However, embodiments are not limited to this and may also be configured such that, for example, the cassette controller 92 turns OFF the power of the electronic cassette 32 to stop radio communication and also the emission of electromagnetic waves from its various built-in circuits.

In the exemplary embodiment, a case has been described where the radio wave detector 98 detects radio waves emitted from a cardiac pacemaker as the medical device. However, the invention is not limited to this. For example, capsule endoscopes that have a built-in micro imaging element have been put to practical use as medical devices in recent years. A capsule endoscope transmits captured image data by radio communication, and after a person swallows the capsule endoscope, a receiver that receives radio waves is attached to the person's body and receives radio waves from the capsule endoscope. The radio waves from such medical devices are extremely weak, so sometimes these medical devices are affected by radio communication between the electronic cassette 32 and the console 42. For this reason, embodiments may be configured such that the cassette controller 92 prohibits radio communication between the electronic cassette 32 and the console 42 when the radio wave detector 98 has detected radio waves emitted from a capsule endoscope. Further, in addition to pacemakers, medical devices that sequentially transmit biological information (pulse, heart rate, body temperature, electrocardiograph, brain waves, blood glucose, etc.) by radio are conceivable. Embodiments may be configured such that the cassette controller 92 prohibits radio communication between the electronic cassette 32 and the console 42 when the radio wave detector 98 has detected radio waves emitted from such medical devices.

Examples of radio wave frequencies that are used in such medical devices include specific energy saving medical telemeter frequencies (400 MHz band) and the Industrial, Scientific and Medical (ISM) bands (900 MHz band, 2.4 GHz band, 5.7 GHz band) such as described, for example, on pp. 8 to 10 of "Studies on the Processing and Wireless Transmission of Bio-signals" (March 2003) by Masaki Kyoso, which is incorporated herein by reference.

In the exemplary embodiment, a case has been described where wired communication between the electronic cassette 32 and the console 42 is enabled and where switching to wired communication is prompted when radio communication is prohibited, but embodiments are limited to this. For example, an embodiment may be configured such that communication between the electronic cassette 32 and the console 42 in a communication mode that does not emit radio waves (electromagnetic waves) such as infrared communication, visible light communication or ultrasound is enabled and such that switching to communication in such communication mode is prompted when radio communication is prohibited.

In the exemplary embodiment, when radio communication has been prohibited after the electronic cassette 32 has captured a radiographic image and before the electronic cassette 32 transmits the image data representing the radiographic image to the console 42, the electronic cassette 32 may hold the generated image data temporarily stored in the memory 90 and transmit the image data when wired communication or radio communication becomes possible.

The electronic cassette 32 may also, when it has detected radio waves emitted from a medical device prior to exposure, prohibit radio communication after transmitting, by radio communication, information calling for prohibition of irradiation with radiation.

The configuration of the radiology information system 10 (see FIG. 1), the configuration of the image capturing system 18 (see FIG. 2 and FIG. 4) and the configuration of the electronic cassette 32 (see FIG. 3) that have been described in the exemplary embodiment are only examples and may be altered depending on the situation within a range that does not depart from the gist of the invention.

Moreover, the flow of the radio communication prohibition processing program (see FIG. 6) that has been described in the exemplary embodiment is only an example and may be altered within a range that does not depart from the gist of the invention.

As described above, according to the radio communication terminal of the exemplary embodiment, the radio communication unit performs radio communication with another device, and the detector detects radio waves in a predetermined frequency range emitted from a medical device that is used integrally with a human body. Included in "used integrally with a human body" are, for example, medical devices that become integrated with a human body as a result of being implanted in a human body, being embedded in a human body, and being swallowed.

The prohibition unit prohibits radio communication by the radio communication unit when radio waves in the predetermined frequency range have been detected by the detector.

As described above, according to the aspect of the present invention, the radio communication terminal can perform radio communication while controlling interference with respect to medical devices resulting from radio electromagnetic waves because the radio communication terminal prohibits radio communication when radio waves in the predetermined frequency range emitted from a medical device that is implanted and used in a human body have been detected.

The radio communication terminal may be configured such that the prohibition unit prohibits radio communication after causing information calling for prohibition of radio communication to be transmitted from the radio communication unit to the other device when radio waves in the predetermined frequency range have been detected.

Further, the radio communication terminal may be configured such that the medical device is a cardiac pacemaker or a capsule endoscope.

Further, the radio communication terminal may further comprise a wired communication unit that is capable of wired communication with the other device, wherein the prohibition unit prompts switching to communication by the wired communication unit and prohibits radio communication by the radio communication unit.

Further, the radio communication terminal may further comprise a communication unit that performs communication with the other device using light or sound waves, wherein the prohibition unit prompts switching to communication by the communication unit and prohibits radio communication by the radio communication unit.

Further, the radio communication terminal may further comprise a warning unit that issues a warning when radio communication has been prohibited by the prohibition unit.

Further, the radio communication terminal may further comprise: a generator that captures a radiographic image expressed by radiation with which the generator has been irradiated and generates image data representing the radiographic image; and a storage unit that stores the generated image data when radio communication has been prohibited by the prohibition unit.

Further, the radio communication terminal may be configured such that the prohibition unit prohibits radio communication after causing information calling for prohibition of irradiation of the generator with radiation to be transmitted from the radio communication unit when radio waves in the predetermined frequency range have been detected by the detector.

Moreover, the radio communication terminal may be configured such that the predetermined frequency range is either a frequency band allocated to a specific energy saving medical telemeter or a frequency band of the ISM bands.

Further, another aspect of the present invention is a radio communication terminal comprising: a radio communication unit that performs radio communication with another device; and a prohibition unit that prohibits radio communication by the radio communication unit when information calling for prohibition of radio communication as a result of having detected radio waves in a predetermined frequency range emitted from a medical device that is implanted and used in a human body has been received by the radio communication unit.

Because of this configuration, the radio communication terminal can perform radio communication while controlling interference with respect to medical devices resulting from radio electromagnetic waves.

Consequently, according to the exemplary embodiment, the radio communication terminal can perform radio communication while controlling interference with respect to medical devices resulting from radio electromagnetic waves.

What is claimed is:

1. A radio communication terminal comprising: a radio communication unit that performs radio communication with another device; a detector that detects radio waves in a predetermined frequency range emitted from a medical device that is used integrally with a human body; and a prohibition unit that prohibits radio communication by the radio communication unit when radio waves in the predetermined frequency range have been detected;
 wherein the prohibition unit prohibits radio communication after causing information calling for prohibition of radio communication to be transmitted from the radio communication unit to the other device when radio waves in the predetermined frequency range have been detected;
 wherein the medical device is a cardiac pacemaker or a capsule endoscope;
 further comprising a wired communication unit that is capable of wired communication with the other device, wherein the prohibition unit prompts switching to communication by the wired communication unit and prohibits radio communication by the radio communication unit.

2. The radio communication terminal according to claim 1, further comprising a communication unit that performs communication with the other device using light or sound waves,
 wherein the prohibition unit prompts switching to communication by the communication unit and prohibits radio communication by the radio communication unit.

3. The radio communication terminal according to claim 1, further comprising a warning unit that issues a warning when radio communication has been prohibited by the prohibition unit.

4. The radio communication terminal according to claim 1, further comprising
 a generator that captures a radiographic image expressed by radiation with which the generator has been irradiated and generates image data representing the radiographic image, and
 a storage unit that stores the generated image data when radio communication has been prohibited by the prohibition unit.

5. The radio communication terminal according to claim 4, wherein the prohibition unit prohibits radio communication after causing information calling for prohibition of irradiation of the generator with radiation to be transmitted from the radio communication unit when radio waves in the predetermined frequency range have been detected by the detector.

6. The radio communication terminal according to claim 1, wherein the predetermined frequency range is either a frequency band allocated to a specific energy saving medical telemeter or a frequency band of the ISM bands.

7. A radio communication terminal comprising: a radio communication unit that performs radio communication with another device; and a prohibition unit that prohibits radio communication by the radio communication unit when information calling for prohibition of radio communication as a result of having detected radio waves in a predetermined frequency range emitted from a medical device that is implanted and used in a human body has been received by the radio communication unit;
 wherein the prohibition unit prohibits radio communication after causing information calling for prohibition of radio communication to be transmitted from the radio communication unit to the other device when radio waves in the predetermined frequency range have been detected;
 wherein the medical device is a cardiac pacemaker or a capsule endoscope;
 further comprising a wired communication unit that is capable of wired communication with the other device, wherein the prohibition unit prompts switching to communication by the wired communication unit and prohibits radio communication by the radio communication unit.

* * * * *